United States Patent Office 3,524,878
Patented Aug. 18, 1970

3,524,878
2,6-(α,α-DIBROMOMETHYL)BENZOIC ACID DERIVATIVES
Karl J. Doebel, Ossining, and John E. Francis, Pleasantville, N.Y., assignors to Geigy Chemical Corporation, Greenburgh, N.Y., a corporation of Delaware
No Drawing. Original application Apr. 1, 1966, Ser. No. 539,294. Divided and this application Jan. 15, 1968, Ser. No. 720,428
Int. Cl. C07c 63/12
U.S. Cl. 260—515     2 Claims

ABSTRACT OF THE DISCLOSURE 2,6-(α,α-dibromomethyl)benzoic acid, optionally substituted in the 4-position, is an intermediate in the synthesis of 8-aldehydo-1(2H)phthalazinone hydrozones.

CROSS REFERENCE

This application is a divisional of Ser. No. 539,294, filed Apr. 1, 1966, now U.S. Pat. No. 3,422,105, issued Jan. 14, 1969, which in turn was a continuation-in-part of copending application Ser. No. 445,762, filed Apr. 5, 1965 now abandoned.

This invention relates to new organic compounds and to intermediates and processes for their preparation. More particularly it relates to 8-aldehydo-1(2H)phthalazinone hydrazones, which possess valuable pharmacological properties.

The instant invention contemplates compounds of the formula:

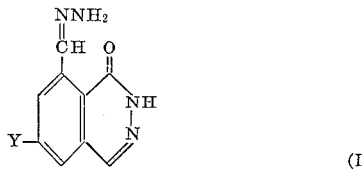

(I)

wherein Y is hydrogen, chloro, bromo or alkoxy of from 1 to 6 carbon atoms. These compounds are valuable cardiovascular agents, in particular blood pressure lowering agents. In addition they serve as intermediates in the preparation of the 1,2,8,9-tetraazaphenalenes described and claimed in the copending application of Karl J. Doebel and John E. Francis, Ser. No. 445,762, filed Apr. 5, 1965.

Special mention is made of a particularly valuable embodiment of this invention, which is 8-aldehydo-1(2H) phthalazinone hydrazone, a compound of Formula I wherein Y is hydrogen. This compound is active in the intact anesthetized cat and shows strong hypotensive activity in the unanesthetized, hypertensive (Goldblatt) dog upon intravenous administration.

The compounds of Formula I may be administered parenterally or orally, together with an inert pharmaceutical carrier, in any of the usual unit dosage forms including tablets, capsules, powders, suspensions, solutions, syrups and the like. Particularly valuable formulations include sustained release preparations which may be compounded by any of the known procedures.

This invention also contemplates compounds of the formula:

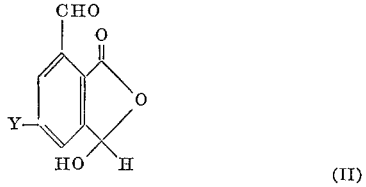

(II)

wherein Y is as above defined. These compounds, as will be shown hereinafter, are valuable starting materials for the preparation of compounds of Formula I.

Also contemplated by this invention are compounds of the formula:

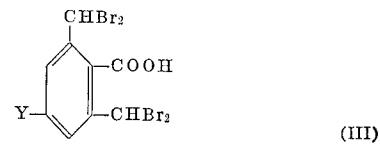

(III)

wherein Y is as above defined. These compounds are valuable for the preparation of compounds of Formula I and of Formula II.

The processes of this invention are depicted schematically as follows:

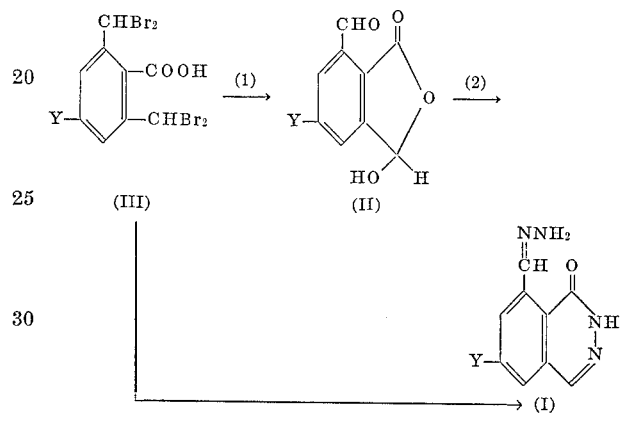

wherein X is as above defined. As will be shown, compounds of Formula I are prepared by the reactions designated step (2) or step (3), both of which are embodiments hereof.

The process contemplated by the instant invention is, in essence, a process for the preparation of a hydrazone of Formula I which comprises heating a compound selected from those of the formulae:

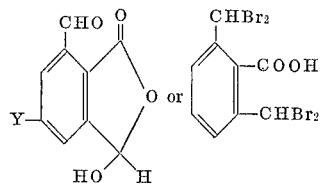

wherein Y is hydrogen, chloro, bromo or alkoxy of from 1 to 6 carbon atoms, with (a) At least two equimolar amounts of aqueous hydrazine hydrate of from about 20 to about 85 percent by weight concentration for from about 15 minutes to about 3 hours; or (b) At least two equimolar amounts of alcoholic hydrazine hydrate of from about 20 to about 100 percent by weight concentration for from about 15 minutes to about 18 hours, until formation of said hydrazone is substantially complete, and recovering said hydrazone.

By the term "alcoholic hydrazine hydrate" is contemplated solutions of hydrazine hydrate in alcohols of from 1 to 6 carbon atoms and preferably ethanol. In order to obtain best yields of compounds of Formula I in the desired state of purity it is important to observe the specified times of heating. In addition, if alcohols with more than about 3 carbon atoms are used, highest yields are obtained if the reaction is conducted at a temperature of below about 120° C. If water or alcohols containing from 1 to 2 carbon atoms are used as diluents for the hydrazine hydrate, then the 8-aldehydo-1(2H)phthalazinone hydrazones are conveniently obtained in good yield if the reaction mixture is heated at reflux temperature for the specified times.

As is disclosed in the said copending application of Karl J. Doebel and John E. Francis, compounds of Formula III are prepared from readily available starting materials. The reaction employed can, for example, involve bromination of the corresponding appropriately substituted 2,6-dimethylbenzoic acid with four moles of bromine in carbon tetrachloride at reflux temperature under the influence of light, according to the following:

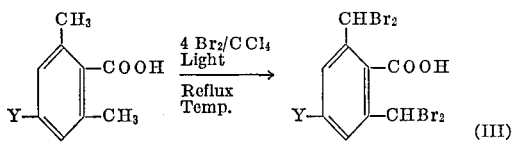

(III)

wherein Y is as above defined. Hydrolysis of the 2,6-(dibromomethyl)benzoic acid with weak aqueous bases such as sodium bicarbonate, sodium carbonate or with dilute solutions of strong bases such as sodium hydroxide, etc. followed by acidification with mineral acids such as hydrohalic acids, in particular hydrochloric acid, or sulfuric acid, etc. leads to compounds of Formula II. These reactions will be exemplified in detail hereafter.

The following examples, presented for illustration and not limitation, will further serve to typify the nature of the present invention.

EXAMPLE 1

2,6-(α,α-dibromomethyl)benzoic acid

A solution of 2,6-dimethylbenzoic acid (17 g., prepared according to Berger and Olivier, Rec. trav. chim. 46, 600 [1927]) in carbon tetrachloride (1200 ml.) is placed in an apparatus consisting of a 3-liter, 3-necked Pyrex flask, magnetic stirrer, dropping funnel and upright condenser leading to a dry wash bottle followed by a wash bottle containing water. The solution is heated to near reflux and then illuminated at close range with a 250 watt tungsten lamp. Bromide (75 g.) in carbon tetrachloride (350 ml.) is added dropwise rather rapidly to maintain vigorous reflux. During the addition time of thirty minutes, hydrogen bromide is evolved and a white precipitate forms. After the addition, stirring and external heating are continued until the evolution of hydrogen bromide ceases. The mixture is cooled, filtered and the precipitate washed several times with carbon tetrachloride. The colorless acid, M.P. 203–206° C., is obtained in a yield of 90% of theory.

*Analysis.*—Calcd. (percent): C, 23.21; H, 1.30; Br, 68.64. Found (percent): C, 23.49; H, 1.07; Br, 68.69.

EXAMPLE 2

4-methoxy-2,6-(α,α-dibromomethyl)benzoic acid 4-methoxy-2,6-dimethylbenzoic acid (prepared according to Fuson, Corse and Welldon, J. Am. Chem. Soc., 63, 2645–8 [1941], 6.3 g.) is dissolved in carbon tetrachloride (450 ml.) in a 3-necked flask equipped with mechanical sealed stirrer, reflux condenser and dropping funnel. The solution is heated to near reflux and illuminated with a 250 watt tungsten lamp as bromine (22.4 g., 7.5 ml.) in carbon tetrachloride (100 ml.) is added dropwise. Reflux is maintained for 2½ hours after the addition, during which time a white precipitate forms. The mixture is cooled and filtered and the precipitate is washed with a little carbon tetrachloride. The yield of pure white solid, M.P. 196–197° C., is 15.68 g. or 90% of theory. The recrystallized product gives the following analysis:

Calcd. for $C_{10}H_8O_3Br_4$ (percent): C, 24.22; H, 1.62; Br, 64.48. Found (percent): C, 24.27; H, 1.65; Br, 64.98.

EXAMPLE 3

4-bromo-2,6-(α,α-dibromomethyl)benzoic acid 4-bromo-2,6-xylic acid (prepared by the procedure of Fuson, Scott and Lindsey, J. Am. Chem. Soc., 63, 1679 [1941], 2.29 g.) is suspended in carbon tetrachloride (120 ml.) and stirred at reflux under illumination from a 250 watt tungsten lamp. Bromine (6.4 g.) in carbon tetrachloride (30 ml.) is added dropwise over a 20 minute period. After a further 15 minutes, a white precipitate begins to appear. The mixture is stirred at reflux under illumination for three hours longer, then cooled and filtered. The product is washed with a little carbon tetrachloride and air dried. The yield of white solid, M.P. 219–221° C., is 4.8 g., or 88% of theory. A sample recrystallized from benzene melts at 220–221° C.

*Analysis.*—Calcd. for $C_9H_5Br_5O_2$ (percent): C, 19.84; H, 0.92; Br, 73.35. Found (percent): C, 19.95; H, 0.71; Br, 73.43.

EXAMPLE 4

4-n-butoxy-2,6-(α,α-dibromomethyl)benzoic acid 4-n-butoxy-2,6-dimethylbenzoic acid, prepared according to Honkanen, Chem. Abstr., 55, 15400 (1961), 47.2 g., is dissolved in carbon tetrachloride, 2000 ml., and stirred at reflux under illumination with a 250 watt tungsten lamp as bromine (45 ml.) in carbon tetrachloride (300 ml.) is added dropwise. The mixture is stirred at reflux for 4 hours thereafter. The reaction mixture is cooled, partially evaporated in vacuo, and allowed to stand under refrigeration overnight. The white precipitate which forms is collected, washed with carbon tetrachloride and dried over phosphorus pentoxide. The product, 24.4 g., M.P. 166–171° C., is recrystallized twice from benzene and obtained in sparkling white needles, M.P. 187–188° C.

*Analysis.*—Calcd. for $C_{13}H_{14}Br_4O_3$ (percent): C, 29.02; H, 2.63; Br, 59.43. Found (percent): C, 29.32; H, 2.40; Br, 59.59.

EXAMPLE 5

3-hydroxy-7-aldehydehydrophthalide 2,6-(α,α-dibromomethyl)benzoic acid prepared by the procedure of Example 1, 37.2 g., is added little by little to a stirring solution of 5% sodium carbonate (600 ml.). The mixture is heated on a steam bath until a clear solution is obtained and then acidified under cooling with concentrated hydrochloric acid. The white precipitate which forms is collected and dried and weighs 9.12 g. The aqueous mother liquor is extracted continuously with chloroform for 24 hours. Evaporation of the chloroform yields 2.57 g. of a second crop; total yield 82%. The first crop is recrystallized from benzenehexane to yield a colorless solid, the melting point, 127–133° C., of which is not changed by further crystallizations.

*Analysis.*—Calcd. (percent): C, 60.67; H, 3.40. Found (percent): C, 60.62; H, 3.25.

EXAMPLE 6

3-hydroxy-5-methoxy-7-aldehydophthalide 4-methoxy-2,6-(α,α-dibromomethyl)benzoic acid prepared according to Example 2, 99.2 g., is added to 5% sodium carbonate solution (1500 ml.) and the mixture is heated on the steam bath under magnetic stirring. The resulting yellow solution is filtered hot, allowed to cool and is acidified with 6 N hydrochloric acid. The white precipitate which forms weighs 12.56 g. and melts at 164–166° C. The mother liquor is extracted continuously with chloroform overnight. Evaporation of the chloroform yields an additional 2.5 g. of product. The total yield is 15.06 g. or 36% of theory. The analytical sample is recrystallized from benzene until a constant melting point, 174–175° C., is obtained.

*Analysis.*—Calcd. for $C_{10}H_8O_5$ (percent): C, 57.69; H, 3.88. Found (percent): C, 57.93; H, 3.59.

EXAMPLE 7

3-hydroxy-5-bromo-7-aldehydophthalide

To a 5% solution of sodium carbonate in water (160 ml.) is added under stirring 4-bromo-2,6-(α,α-dibromomethyl)benzoic acid prepared according to Example 3, 10.9 g., and the solution is heated for one-half hour on a steam bath. A transient white precipitate appears during the heating process. The solution is filtered hot, then is cooled and acidified with 6 N hydrochloric acid. The solid is collected, washed with water and dried in vacuo. The white product weighs 1.66 g., M.P. 187–189° C. Continuous chloroform extraction of the mother liquor during 24 hours yields an additional 0.54 g. of product.

EXAMPLE 8

3-hydroxy-5-n-butoxy-7-aldehydophthalide 4-n-butoxy-2,6-(α,α-dibromomethyl)benzoic acid prepared by the procedure of Example 4, 2.0 g., is suspended in 5% aqueous sodium carbonate (100 ml.) and heated on a steam bath for one hour. The solution is filtered, cooled and acidified with concentrated hydrochloric acid. The acidic solution is extracted continuously with chloroform for 24 hours. The chloroform extract is evaporated in vacuo to yield a thick colorless oil. The infrared spectrum of the product is in agreement with the structural assignment, with prominent peaks at 1765 cm.$^{-1}$ (γ-lactone), 1700 cm.$^{-1}$ (aldehyde) and 1600 cm.$^{-1}$ (benzene ring).

EXAMPLE 9

8-aldehydo-1(2H)phthalazinone hydrazone 3-hydroxy-7-aldehydophthalide prepared by the procedure of Example 5, 6.0 g., is added to a stirring solution of 100% hydrazine hydrate (100 cc.) in water (65 cc.) and heated under reflux for 30 minutes. The hot solution is filtered free of a small amount of insoluble material and allowed to cool overnight in a refrigerator. The yellow crystals are washed with water and dried in vacuo at 40° C. for 66 hours. The product, 3.25 g., shows a single spot in thin layer chromatographic examination and is analytically pure. A small portion sublimes at 120° C./0.05 mm. unchanged. The melting point of the sublimed and unsublimed material is 235–237° C.

*Analysis.*—Calcd. (percent): C, 57.43; H, 4.29; N, 29.77. Found (percent): C, 57.28; H, 4.23; N, 30.04.

In a similar fashion, using the appropriately substituted 3-hydroxy-7-aldehydophthalides of Examples 6, 7 and 8 there are obtained, respectively, 8-aldehydo-6-methoxy-1(2H)phthalazinone hydrozone, 8-aldehydo-6-bromo-1(2H)phthalazinone hydrazone and 8-aldehydo-6-n-butoxy-1(2H)phthalazinone hydrazone.

EXAMPLE 10

8-aldehydo-1(2H)phthalazinone hydrazone (Preparation in an alcohol)

A mixture of 50% aqueous hydrazine hydrate (4 ml.), absolute ethanol (10 ml.) and 2,6-(dibromomethyl)benzoic acid (466 mg.) is heated at reflux for 18 hours. The clear solution is evaporated in vacuo, triturated with water and filtered. The precipitate (240 mg.) has an infrared spectrum identical to an authentic sample of 8-aldehydo-1(2H)phthalazinone hydrazone.

EXAMPLE 11

6-methoxy-8-aldehydo-1(2H)phthalazinone hydrazone

A mixture of 3-hydroxy-5-methoxy-7-aldehydophthalide (2.87 g.), 100% hydrazine hydrate (42 ml.) and water (28 ml.) is heated at reflux for 50 minutes. The yellow solution is filtered hot and then allowed to cool slowly. The yellow solid which forms is collected and dried. This material (960 mg.) is recrystallized once from water and once from ethanol. The yellow crystalline product melts at 220–227° C.

What is claimed is:

1. A compound of the formula:

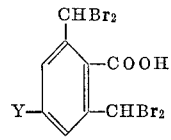

wherein Y is hydrogen, chloro, bromo or alkoxy of from 1 to 6 carbon atoms.

2. A compound as defined in claim 1 wherein Y is hydrogen.

References Cited

FOREIGN PATENTS 236,046    7/1910    Germany.

OTHER REFERENCES

Perkin et al.: J. Chem. Soc., vol. 127, pp. 2275–97 (1925).

Matsukawa et al.: Chem. Abstracts, vol. 45, 1672c (1951).

JAMES A. PATTEN, Primary Examiner

U.S. Cl. X.R.

260—521

PO-1050
(5/69)

UNITED STATES PATENT OFFICE
CERTIFICATE OF CORRECTION

Patent No. 3,524,878      Dated Aug. 18, 1970

Inventor(s) Karl J. Doebel and John E. Francis

It is certified that error appears in the above-identified patent and that said Letters Patent are hereby corrected as shown below:

In column 2, in the structural formula at lines 16-34, "(3)" should appear above the arrow from (III) to (II).

In column 2, line 36, "X" should be -- Y --

In column 2, the second structural formula at lines 44 to 50 should appear as

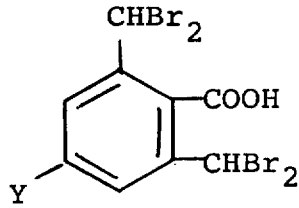

SIGNED AND
SEALED
JAN 5 1971

(SEAL)
Attest:

Edward M. Fletcher, Jr.
Attesting Officer

WILLIAM E. SCHUYLER, JR.
Commissioner of Patents